Sept. 14, 1948.     T. R. HARRISON     2,449,476
ANTIHUNT ELECTRICAL SERVOMOTOR SYSTEM
Original Filed March 25, 1944
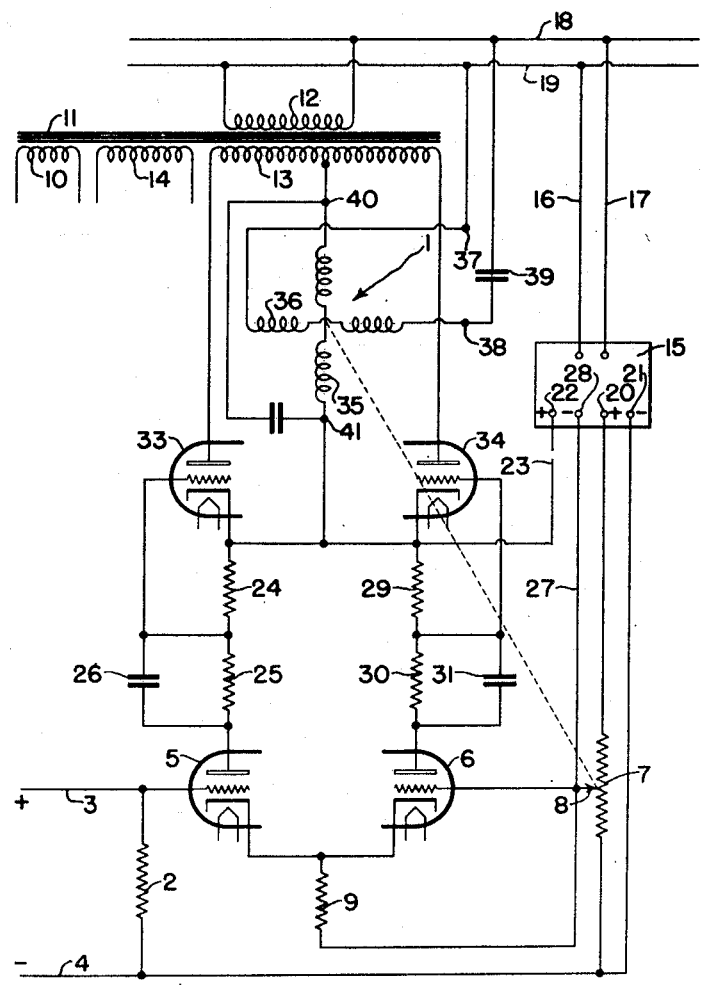
INVENTOR.
THOMAS R. HARRISON
BY Arthur N. Swanson
ATTORNEY Patented Sept. 14, 1948

2,449,476

UNITED STATES PATENT OFFICE 2,449,476

ANTIHUNT ELECTRICAL SERVOMOTOR SYSTEM

Thomas R. Harrison, Wyncote, Pa., assignor to The Brown Instrument Company, Philadelphia, Pa., a corporation of Pennsylvania Original application March 25, 1944, Serial No. 528,088. Divided and this application May 1, 1947, Serial No. 745,308

4 Claims. (Cl. 318—207)

The present invention is a division of my prior application, Serial No. 528,088, filed on March 25, 1944, for arrangements, including that illustrated and described herein, of self-balancing, electrical networks of the potentiometric or Wheatstone bridge type in which the rebalancing operations are rapidly effected as required by means including a reversible rotatable rebalancing motor. Such a motor has a tendency to "coast" or continue its rotation after being de-energized.

A general object of the present invention is to provide self-balancing exhibiting and/or controlling apparatus in which the controlling voltage for effecting selective energization of the reversible rebalancing motor for rotation in one direction or the other is unidirectional voltage and including novel and effective means for introducing an anticipating control action into the apparatus rebalancing operation so as to eliminate or at least to substantially minimize the hunting tendency which inevitably results from failure to terminate the rebalancing operations of the motor promptly enough to compensate for the inertia of the motor and the other moving components of the apparatus.

In accordance with the present invention, upon change in the magnitude of a measured or controlling condition, a normally balanced electrical network becomes unbalanced and sets into operation a driving system for effectuating a rebalancing adjustment of the network. Before completion of the rebalancing operation an additional electrical effect is created which causes premature deenergization of the driving system, and if desired, energization of the driving system for operation in the reverse direction. This additional electrical effect is correlated to the unbalance of the network in such manner that the driving system operates to rebalance the network in a minimum of time without the occurrence of overshooting of the balanced point of the network and consequent hunting.

Such anti-hunting provisions are desirable in self-balancing electrical networks inasmuch as the inertia of the various mechanically connected parts tends to so operate as to carry the driving system and its associated network rebalancing means beyond the true position of balance. When such overshooting occurs, the network then becomes unbalanced in the opposite direction and initiates operation of the driving system in the reverse direction in an attempt to obtain rebalance, but again the necessary regulation is exceeded to thereby set up a continuous hunting about the balanced point.

The need for anti-hunting provisions in exhibiting and controlling apparatus of the self-balancing type has long been recognized and various methods and structures have been proposed heretofore for supplying this need. For example, it has been proposed to eliminate the hunting tendency by reducing the sensitivity of response of the system to unbalance thereof, but such a solution is generally unsatisfactory because of the attendant reduction in the available power to pull the system into its exact condition of balance. One prior art method for eliminating the hunting tendency in such apparatus is disclosed in Patent 1,827,520, issued to me on October 13, 1931, for Recording and control system and apparatus therefor and reissued as Re. 21,309, in which the speed of rebalance of an electrical network is proportional to the extent of network unbalance and mechanically movable means are provided to anticipate the true position of balance. Other prior art structures have provided means operative in response to the mechanical motion of the driving system for creating an electromotive force which is proportional to the speed of the driving system and which is opposed to the network unbalance to produce a condition of simulated rebalance of the network or a simulated condition of reverse unbalance before the network is actually rebalanced to thereby prematurely deenergize or to reverse the direction of energization of the driving system. As a result, the driving system is slowed down before the balanced position is reached and gradually eases into the balanced position without exceeding it.

A specific object of the present invention is to provide improved anti-hunting means for use in self-balancing exhibiting and controlling apparatus in which an effect is created in a simple and efficient manner by solely electrical means without reducing the sensitivity of response of the system to unbalance thereof and without involving the use of any physically movable parts whatever for terminating the rebalancing operation sufficiently prior to the attainment of rebalance as required to compensate for the inertia of the driving system and associated rebalancing structure.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

There is shown in the single figure of the drawing a self-balancing electrical network in which my present invention may advantageously be incorporated in which the controlling voltage for effecting selective energization of a reversible electrical rebalancing motor, designated by the reference character 1, for rotation in one direction or the other is a unidirectional voltage. Specifically, the controlling voltage is that produced across a resistance 2 and is variable in magnitude in accordance with the changes in a variable condition to be measured. The manner in which the variable unidirectional voltage is produced across resistance 2 is immaterial for the purposes of the present invention. Merely by way of illustration and example, it may be produced by a direct current flow through resistance 2 from conductors 3 and 4 which may be connected in the output circuit of a photoelectric pyrometer of the type disclosed in Figure 1 of the J. T. Nichols Patent 2,241,557, which was issued on May 13, 1941, from an application filed July 25, 1936.

The variable unidirectional voltage drop produced across the resistance 2 is impressed on the input circuit of a triode 5 having anode, control electrode, cathode and heater filament elements. Triode 5 comprises one triode of a twin tube which contains a second triode 6 which may be identical to the triode 5. The input circuit for the triode 5 may be traced from the control electrode through resistance 2, a slide wire resistance 7, a contact 8 which is in slideable engagement with resistance 7, and a cathode biasing resistance 9 to the cathode of triode 5. The input circuit of triode 6 may be traced from the control electrode through the cathode biasing resistance 9 to the cathode of triode 6.

Energizing voltage is supplied the heater filaments of triodes 5 and 6 from the secondary winding 10 of a transformer 11 having a line voltage primary winding 12 and secondary windings 13 and 14 in addition to the secondary winding 10.

A unidirectional current flow is established through the slidewire resistance 7 by a full wave rectifier and filter arrangement generally designated by the reference character 15 which receives energizing current through supply conductors 16 and 17 from the supply conductors 18 and 19. To this end, the end terminals of resistance 7 are connected to the output terminals 20 and 21 of the rectifier and filter 15. The polarity of the terminal 20 is positive with respect to that of terminal 21, and hence, the potential of the upper terminal of resistance 7 is rendered positive with respect to the lower terminal when the variable potential drop under measurement produced across resistance 2 is of the polarity indicated. The sliding contact 8 in engagement with resistance 7 is arranged to be adjusted along the length of resistance 7 by the reversible electrical motor 1. Preferably, the slide wire resistance 7 and contact 8 are arranged in cooperative relation with a recorder chart and recording mechanism as is shown in Figure 2 of my aforesaid prior application, of which this is a division, to provide a record of the variations in voltage across resistance 2.

Anode voltage is supplied to triodes 5 and 6 from the full wave rectifier and filter 15. Specifically, the anode circuit of triode 5 may be traced from the positive terminal 22 of the rectifier and filter 15 through a conductor 23, a resistance 24, a parallel connected resistance 25 and condenser 26 to the anode of triode 5, the cathode, the cathode biasing resistance 9 and a conductor 27 to the negative terminal 28 of the rectifier and filter 15. The anode circuit of triode 6 may be traced from the positive terminal 22 through conductor 23, a resistance 29, a parallel connected resistance 30 and condenser 31 to the anode of triode 6, the cathode, the cathode biasing resistance 9 and the conductor 27 to the negative terminal 28.

The potential drop produced across resistance 24 by the anode current flow through the triode 5 is impressed on the input circuit of a triode 33 and the potential drop produced across the resistance 29 by the anode current flow of triode 6 is impressed on the input circuit of a triode 34. Specifically, the cathodes of triodes 33 and 34 are connected to the upper ends of resistances 24 and 29, the control electrode of triode 33 is connected to the lower end of resistance 24, and the control electrode of triode 34 is connected to the lower end of resistance 29. The triodes 33 and 34 receive anode energizing voltage from the transformer secondary winding 13 and are arranged to effect selective actuation of the motor control winding 35 with pulsating current which leads or lags by approximately 90° the voltage of the alternating supply mains 18 and 19 when one or the other of the triodes 33 and 34 is rendered more conductive than the other.

Motor 1 is a two phase rotating field motor and comprises a rotor, not shown, and two pairs of oppositely disposed field poles on one pair of which winding 35 is wound and on the other pair of which a winding 36 is wound. Winding 36 has its terminals connected to the motor terminals 37 and 38 and is supplied with energizing current from the alternating current supply mains 18 and 19 through the condenser 39. Because of the inclusion of condenser 39 in the energizing circuit of winding 36, the current flow through this winding will be substantially in phase with the voltage of the alternating current supply mains 18 and 19. The winding 35 has its terminals connected to the motor terminals 40 and 41 and is supplied with energizing current from the output circuits of the two triodes 33 and 34. The current supplied to the winding 35 from the triodes 33 and 34 either leads or lags by approximately 90° the voltage of the alternating current supply mains and establishes a field in the motor rotor which is displaced 90° in one direction or the other with respect to that established therein by the winding 36. The reaction between the field set up by the winding 35 with that set up by the winding 36 establishes a rotating field in the rotor which rotates in one direction or the other depending upon whether the winding 35 is energized with current which leads or lags the voltage supplied by the supply mains 18 and 19, and consequently in accordance with the direction of unbalance of the network. The direction and duration of rotation of the motor 1 is controlled in accordance with the direction and extent of unbalance of the network so that on rotation of the motor 1 the sliding contact 8 is adjusted in the proper direction to rebalance the network.

In the balanced condition of the arrangement of the drawing, the sliding contact 8 will assume such a position along the length of resistance 7 that the potential drop across resistance 7 tapped off by the contact 8 is exactly equal and opposite to the potential drop produced across the resistance 2. With such adjustment, the control electrode of triode 5 will be at the potential of the lower or negative end of cathode biasing resistance 9, as will also the control electrode of triode 6. The anode current flow through the resistance 24 will then be exactly the same as that through the resistance 29, and consequently, the control electrode of triode 33 will be at the same potential as that of triode 34. Under this condition, conductivity of triode 33 is exactly the same as that of triode 34, and hence, motor 1 will not be energized for rotation in either direction.

Upon change in the voltage drop produced across resistance 2, for example, upon an increase in that potential drop, the triode 5 will be rendered more conductive than the triode 6. Consequently, the potential drop across resistance 24 will increase to cause the control electrode of triode 33 to become negative with respect to the potential of the associated cathode. This will cause the conductivity of triode 33 to decrease relatively to the conductivity of triode 34, and therefore, effectuate energization of motor 1 for rotation. The direction of rotation of motor 1 will be such as to cause movement of the sliding contact 8 in the upward direction to counteract the increased potential produced across resistance 2.

Upon sustained unbalance in the opposed potential drops across resistances 2 and 7, the condenser 26 in the anode circuit of triode 5 will gradually charge to cause an increase in the voltage drop across the resistance 25. This increased potential drop across resistance 25 effectively decreases the anode voltage applied to triode 5, and therefore, causes a reduction in the amplification which is provided by the triode 5. Thus, upon unbalance, the amplification provided by triode 5 for the case considered is rendered less than that of triode 6. As the potential of the control electrode of triode 5 relatively to the potential of the associated cathode is gradually restored to its original value due to adjustment of contact 8 along slide-wire resistance 7, delayed recovery in the potential drop across resistance 25 to its original value causes the amplification of triode 5 to temporarily remain at such decreased value with the result that the potential drop across resistance 24 will be restored to equality with the voltage drop across resistance 29 before the adjustment of the contact 8 to the new balanced position has been completed. Restoration of the potential drops across resistances 24 and 29 causes deenergization of motor 1 for rotation. Thus, the motor 1 is prematurely deenergized for rotation as a result of the action of the parallel connected resistance 25 and condenser 26. By proper choice of the circuit components, the potential drop across resistance 24 may even become less than that across resistance 29 before the adjustment of contact 8 is completed to thereby effectuate energization of reversible motor 1 for rotation in the reverse direction.

The aforementioned damping action is further enhanced by the operation of the resistance 30 and condenser 31 in the anode circuit of triode 6. When the conductivity of triode 5 is increased, the bias voltage produced across resistance 9 is increased to cause the potential of the control electrode of triode 6 to be rendered more negative with respect to the potential of the associated cathode. Consequently, upon increase in the conductivity of triode 5 the conductivity of triode 6 will be decreased. Decrease in the conductivity of triode 6 will cause a decrease in the current flow through resistances 29 and 30 and, therefore, will cause an increase in the conductivity of the triode 34. Such increase in conductivity of triode 34 is in the proper direction to produce a greater energizing current flow to motor 1 for rotation in the direction of rotation. The decrease in potential drop across resistance 30 causes a greater anode voltage to be applied to the anode of the triode 6 and therefore provides greater amplification from the triode 6. While the potential of the control electrode 5 is being restored to its original value relatively to that of its associated cathode, the condenser 31 delays recovery of the potential drop across resistance 30 to its original value, and therefore, tends to maintain the amplification of the triode 6 at an increased value at the same time that the condenser 26 tends to maintain the amplification of triode 5 at a decreased value. These two effects combine to effect premature energization of the motor for rotation in the reversed direction to quickly bring the motor to a stop and prevent overshooting and consequent hunting.

While in accordance with the provisions of the statutes, I have illustrated and described the best form of my invention now known to me, it will be apparent to those skilled in the art that changes in the form of the embodiment of my invention illustrated and described herein may be made without departing from the spirit of the invention as set forth in the appended claims. It will be understood also that use may sometimes be advantageously made of some features of my invention without a corresponding use of other features.

Having now described my invention what I claim as new and desire to secure by Letters Patent is as follows:

1. Means to control the operation of a reversible electrical motor for rotation in one direction or the other including terminals to which an alternating current supply source providing alternating current of predetermined frequency is adapted to be connected, a pair of electronic valves having normally equally conductive output circuits connected in opposite phase relation to said alternating current supply source and having input circuits to which a variable unidirectional voltage is coupled to increase the conductivity of one of said valves above that of the other of said valves, means to couple said unidirectional voltage to said input circuits, said coupling means including electrical reactance means operative upon decrease in said unidirectional controlling voltage to restore equality in the conductivities of said valves before said controlling voltage is reduced to zero, and an alternating current motor having a winding coupled to said output circuits and a winding connected to said terminals.

2. The combination of claim 1 wherein said electrical reactance means includes a parallel connected resistance element and a capacitive element.

3. Means to control the operation of a reversible electrical motor for rotation in one direction or the other including a first pair of terminals to which an alternating current supply source providing alternating current of predetermined frequency is adapted to be connected, a first pair of electronic valves having normally equally conductive output circuits connected in opposite phase relation to said alternating current supply source and each having an input circuit, an alternating current motor having a winding coupled to said output circuits and a winding connected to said first pair of terminals, a second pair of electronic valves having normally conductive output circuits and each having an input circuit, a second pair of terminals to which a unidirectional voltage supply source is adapted to be connected and connected in the output circuits of said second pair of electronic valves for supplying unidirectional energizing voltage thereto, a separate pair of series arranged resistors connected in the output circuit of each of said second pair of electronic valves, a separate condenser connected in parallel with one resistor of each pair of said resistors, means connecting the other resistor of one pair of said resistors in the input circuit of one of said first pair of electronic valves, means connecting the other resistor of the other pair of said resistors in the input circuit of the other of said first pair of electronic valves, control means to apply unidirectional voltage to the input circuit of one of said second pair of electronic valves, and means to apply a separate unidirectional voltage to the input circuit of the other of said second pair of electronic valves.

4. The combination of claim 3 wherein said control means is operable to apply a unidirectional voltage of variable magnitude to the input circuit of said one of said second pair of electronic valves, and wherein said last mentioned means includes an adjustable impedance physically coupled to said motor for adjustment in accordance with the rotation of said motor, the magnitude of the unidirectional voltage applied by said last mentioned means to the other of said second pair of electronic valves being variable in accordance with the adjustment of said adjustable impedance.

THOMAS R. HARRISON.